(12) United States Patent
Cai et al.

(10) Patent No.: US 8,762,474 B2
(45) Date of Patent: Jun. 24, 2014

(54) NOTIFICATION OF WAITING VOICEMAIL MESSAGES BETWEEN DIFFERENT TYPES OF COMMUNICATION NETWORKS

(75) Inventors: Yigang Cai, Naperville, IL (US); Alok Sharma, Lisle, IL (US)

(73) Assignee: Alcatel Lucent, Paris (FR)

( * ) Notice: Subject to any disclaimer, the term of this patent is extended or adjusted under 35 U.S.C. 154(b) by 1727 days.

(21) Appl. No.: 11/833,425

(22) Filed: Aug. 3, 2007

(65) Prior Publication Data

US 2009/0037540 A1    Feb. 5, 2009

(51) Int. Cl.
*G06F 15/16* (2006.01)
(52) U.S. Cl.
USPC ............................ 709/207; 709/203; 709/206
(58) Field of Classification Search
USPC ......... 709/217–218, 246, 201, 202, 203, 204, 709/205, 206, 207
See application file for complete search history.

(56) References Cited

U.S. PATENT DOCUMENTS

| 6,389,276 | B1 * | 5/2002 | Brilla et al. | 455/413 |
| 6,721,565 | B1 * | 4/2004 | Ejzak et al. | 455/436 |
| 6,754,181 | B1 * | 6/2004 | Elliott et al. | 370/252 |

* cited by examiner

*Primary Examiner* — Dhairya A Patel
(74) *Attorney, Agent, or Firm* — Duft, Bornsen & Fettig, LLP

(57) ABSTRACT

Systems and methods are disclosed that provide notification of waiting voicemail messages between different types of communication networks. A first communication network as described herein includes a voicemail server to store voicemail messages for a user of a communication device. A second communication network provides phone service to the communication device but uses a different signaling protocol than the first communication network. In order to notify the user of the waiting voicemail message in the voicemail server, a subscriber server (e.g., an HLR) in the first communication network receives a voicemail waiting indicator in the signaling protocol of the first communication network, identifies the signaling protocol of the second communication network, and converts the voicemail waiting indicator to the signaling protocol of the second communication network. The second communication network may then provide notification of the waiting voicemail message to the user.

20 Claims, 7 Drawing Sheets

NOTIFICATION OF WAITING VOICEMAIL MESSAGES BETWEEN DIFFERENT TYPES OF COMMUNICATION NETWORKS

BACKGROUND OF THE INVENTION

1. Field of the Invention

The invention is related to the field of communication networks and, in particular, to providing notifications of waiting voicemail messages. More particularly, when a communication device is receiving phone service from a communication network that uses a different signaling protocol than the communication network in which a voicemail server is located, systems and methods are described that convert a voicemail waiting indicator from the signaling protocol of the voicemail server to the signaling protocol used by the communication network that is providing phone service to the communication device.

2. Statement of the Problem

Voicemail is a service that allows a calling party to leave a phone message for a called party when the called party is not available to answer a call. When a voicemail message is received for a called party, some voicemail services provide a notification that a voicemail message is waiting for the called party. For instance, a mobile communication network may transmit a voicemail waiting indicator to a mobile device responsive to which the mobile device may display an icon or some other indication that the called party has received a voicemail message. The called party may then retrieve the voicemail message from the communication network.

As an example of a communication network providing notification of a waiting voicemail message, assume that a called party is a mobile user receiving phone service from a 2G mobile communication network, such as a CDMA or GSM network. The mobile communication network includes a serving-Mobile Switching Center (MSC) that is serving the called party, and includes a Home Location Register (HLR) that stores a subscriber profile for the called party. The mobile communication network also includes a voicemail server that provides the voicemail service. Assume that a call to the called party is received in the mobile communication network and that the called party is not available to answer the call. When the called party is identified as being unavailable to answer the call, the serving-MSC applies a secondary treatment for the call which is routing the call to the voicemail server. The voicemail server receives the call and records a voicemail message from the calling party.

Voicemail server also transmits a voicemail waiting indicator to the serving-MSC indicating that a voicemail message is waiting in the voicemail server. The protocol used to transmit the voicemail waiting indicator depends on the signaling protocol used in the mobile communication network. For instance, if the mobile communication network comprises a CDMA network, then the voicemail waiting indicator is in ANSI protocol. If the mobile communication network comprises a GSM network, then the voicemail waiting indicator is in MAP protocol. Responsive to receiving the voicemail waiting indicator from the voicemail server, the serving-MSC transmits the appropriate voicemail waiting indicator to the mobile device of the called party. The mobile device then processes the voicemail waiting indicator to display an icon or some other indication that the called party has a voicemail message waiting in the voicemail server. The called party may then dial a directory number for the voicemail server through the mobile device to retrieve the waiting voicemail message.

Some mobile service providers allow for dual mode service. Dual mode service allows a mobile device to communicate with different types of mobile communication networks that utilize different wireless protocols. As an example, dual mode service may allow a mobile device to communicate with different types of cellular networks, such as a CDMA network and a GSM network. In another example, dual mode service may allow a mobile device to communicate with a cellular network and a wireless data network, such as a CDMA network and an IMS network. Mobile devices that are able to receive a dual mode service are referred to as dual mode devices.

One problem with notifying a called party that a voicemail message is waiting occurs when the called party is roaming in or is receiving service from a communication network that uses a different signaling protocol than the communication network in which the voicemail server is located. For instance, assume that a called party subscribes to phone service in a CDMA network. The signaling protocol used in a CDMA network is ANSI. By subscribing to phone service in the CDMA network, the called party also subscribes to a voicemail service in the CDMA network. This means that the voicemail server maintaining the voicemail account for the called party uses ANSI signaling protocol. If the called party has a dual mode device, then the called party is able to roam into service areas of other types of mobile communication networks, such as a GSM network, to receive phone service. The GSM network uses a different signaling protocol (MAP) than the CDMA network. Presently, if the voicemail server in the CDMA network records a voicemail message for the called party, then the voicemail server transmits a voicemail waiting indicator to the home MSC in the CDMA network. However, because the home MSC in the CDMA network is not presently serving the dual mode device of the called party, the home MSC is not able to transmit the voicemail waiting indicator to the dual mode device. Further, because the home MSC in the CDMA network and the serving-MSC in the GSM network use different signaling protocols for communication, the home MSC in the CDMA network is not able to transmit the voicemail waiting indicator to the serving-MSC in the GSM network. As a result, the called party is not able to receive a notification that a voicemail message is waiting in the voicemail server. The called party will not receive the voicemail waiting indicator until he/she returns to a service area of the CDMA network.

SUMMARY OF THE SOLUTION

The invention solves the above and other related problems by using a subscriber server, such as an HLR, a Home Subscriber Server (HSS), or a combined HLR/HSS, to provide a notification that a voicemail message is waiting in a voicemail server. Assume that a user of a communication device subscribes to phone service and voicemail service through a first communication network that uses a first signaling protocol. Assume further that the user of the communication device is presently receiving phone service through a second communication network that uses a second signaling protocol that is different than the first signaling protocol. When a voicemail server in the first communication network receives a voicemail message for the user, the voicemail server or another node in the first communication network transmits a voicemail waiting indicator to the subscriber server in the first communication network. The voicemail waiting indicator is in the first signaling protocol used by the first communication network.

In order to provide notification of the waiting voicemail message to the user that is being served by the second communication network, the subscriber server identifies the second signaling protocol used in the second communication network, and converts the voicemail waiting indicator from the first signaling protocol to the second signaling protocol used by the second communication network. The subscriber server then transmits the voicemail waiting indicator in the second signaling protocol to the second communication network. The second communication network may then provide the voicemail waiting indicator to the communication device so that an icon or some other indication may be provided to the user of the communication device. The user of the communication device is advantageously notified of the waiting voicemail message even though the first communication network having the voicemail server is using a different signaling protocol than the second communication network that is presently serving the communication device of the user.

One embodiment of the invention comprises a subscriber server that provides notification of a waiting voicemail message to a user. The subscriber server is implemented in a first communication network using a first signaling protocol, and the user to which the voicemail message is intended is being provided phone service by a second communication network that uses a second signaling protocol. An example of the first communication network may be a CDMA network while an example of the second communication network may be a GSM network.

Responsive to a voicemail server in the first communication network recording a voicemail message intended for the user, the subscriber server receives a voicemail waiting indicator in the first signaling protocol indicating that a voicemail message is waiting in the voicemail server in the first communication network. The subscriber server then identifies the second signaling protocol used in the second communication network that is presently providing phone service to the communication device of the user. The subscriber server then converts the voicemail waiting indicator in the first signaling protocol to the second signaling protocol used in the second communication network. The subscriber server then transmits the voicemail waiting indicator in the second signaling protocol to the second communication network to provide for notification of the waiting voicemail message.

The second communication network thus receives the voicemail waiting indicator in a signaling protocol that it can interpret. The second communication network is then able to provide a voicemail waiting indicator to the communication device of the user. In response to the voicemail waiting indicator, the communication device displays an icon or some other indication that the user has a voicemail message waiting in the first communication network. The user may then retrieve the voicemail message.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
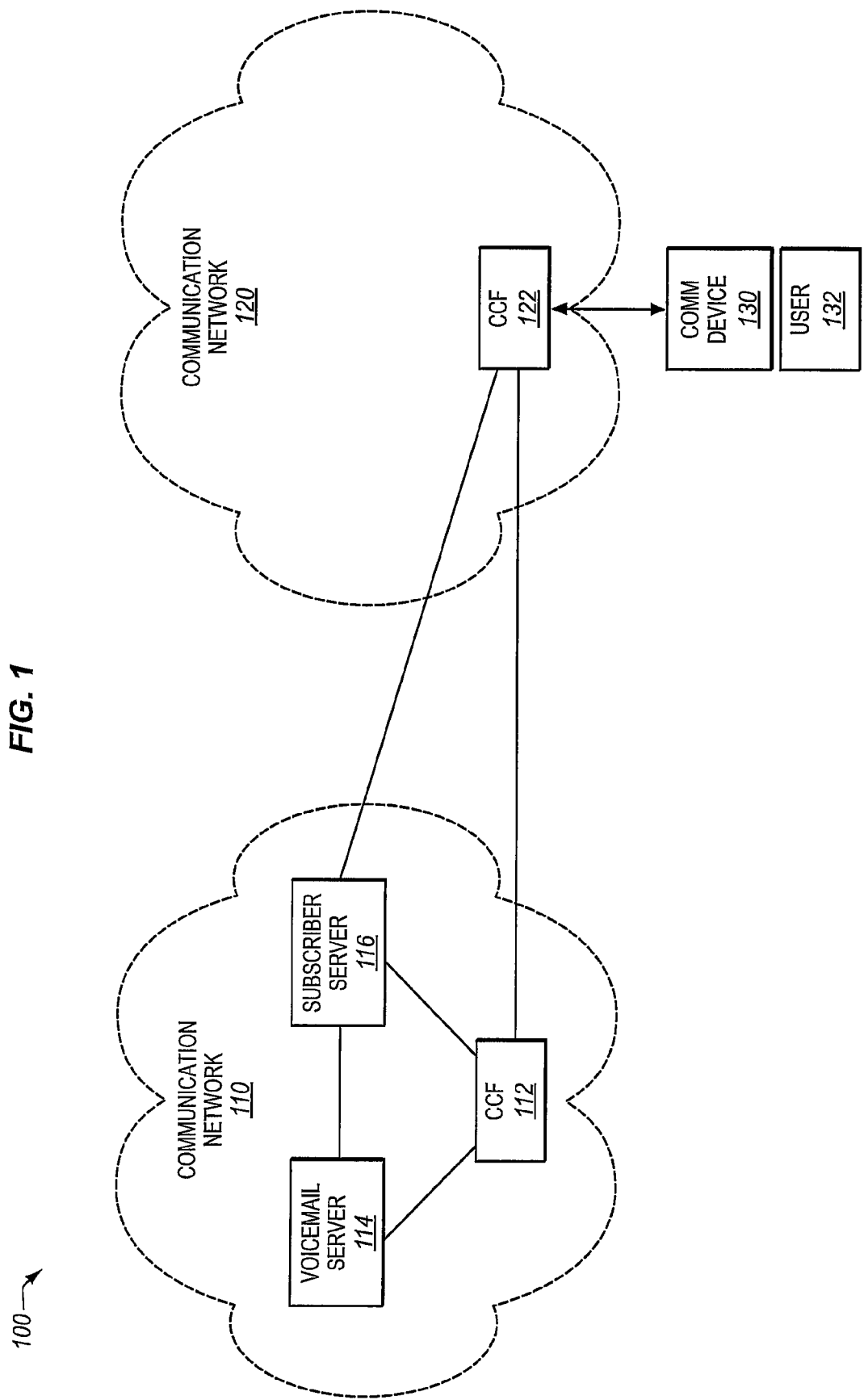
FIG. 1 illustrates a communication system in an exemplary embodiment of the invention.

FIG. 1 illustrates a communication system 100 in an exemplary embodiment of the invention. Communication system 100 includes a first communication network 110 and a second communication network 120. Communication network 110 and/or communication network 120 may comprise a wireless network, such as a CDMA network, a GSM network, or an IMS network, or may comprise a wireline network such as a PSTN or an IMS network. The network clouds illustrating the networks are not being used to show the actual service areas of the networks, as the service areas may be separate or overlap. Communication networks 110 and 120 are both adapted to provide phone service to a communication device 130. Communication device 130 may comprise a mobile device adapted to communicate via wireless signals, such as a mobile phone, a PDA, a mobile VoIP phone, etc, or may comprise a wireline device.

Communication network 110 includes a call control function (CCF) 112 adapted to serve a communication device 130 if communication device 130 registers in communication network 110. For example, call control function 112 may comprise an MSC in a cellular network or may comprise a Call Session Control Function (CSCF) in an IMS network. Communication network 110 also includes a voicemail server 114 and a subscriber server 116. Voicemail server 114 comprises any system, server, or application adapted to provide a voicemail service to a user 132 of communication device 130. Subscriber server 116 comprises any database, server, or application adapted to store and maintain subscriber information or subscriber data for one or more subscribers, such as user 132. For instance, subscriber server 116 may maintain subscriber data in the form of a subscriber record or subscriber profile for user 132. Subscriber server 116 may comprise a single centralized system or may be distributed among multiple systems. If implemented in multiple systems, then the systems communicate to maintain common subscriber data. Subscriber server 116 may comprise a Home Location Register (HLR), such as a Super-Distributed HLR (S-DHLR) from Lucent Technologies. Subscriber server 116 may alternatively comprise a Home Subscriber Server (HSS) or a combined HLR/HSS.

Communication network 120 includes a call control function 122 also adapted to serve communication device 130 if communication device 130 registers with communication network 120. Communication network 120 may also include a voicemail server and a subscriber server that are not shown for the sake of brevity. In order to be able to receive phone service from either of communication network 110 or communication network 120, communication device 130 may comprise a dual mode device. A dual mode device is able to communicate with different types of communication networks, such as a CDMA and a GSM network, a CDMA and an IMS network, etc.

Communication network 110 uses a first signaling protocol for setting up, maintaining, and tearing down calls. Exemplary signaling protocols include ANSI, MAP, ISUP, SIP, Diameter, etc. Communication network 120 uses a second signaling protocol that is different than the first signaling protocol. For example, communication network 110 may use an ANSI-based signaling protocol while communication network 120 uses a GSM MAP-based signaling protocol, or vice-versa. In another example, communication network 110 may use an ANSI-based signaling protocol while communication network 120 uses a SIP-based signaling protocol, or vice-versa. In another example, communication network 110 may use a GSM MAP-based signaling protocol while communication network 120 uses a SIP-based signaling protocol, or vice-versa.

Figure 2:
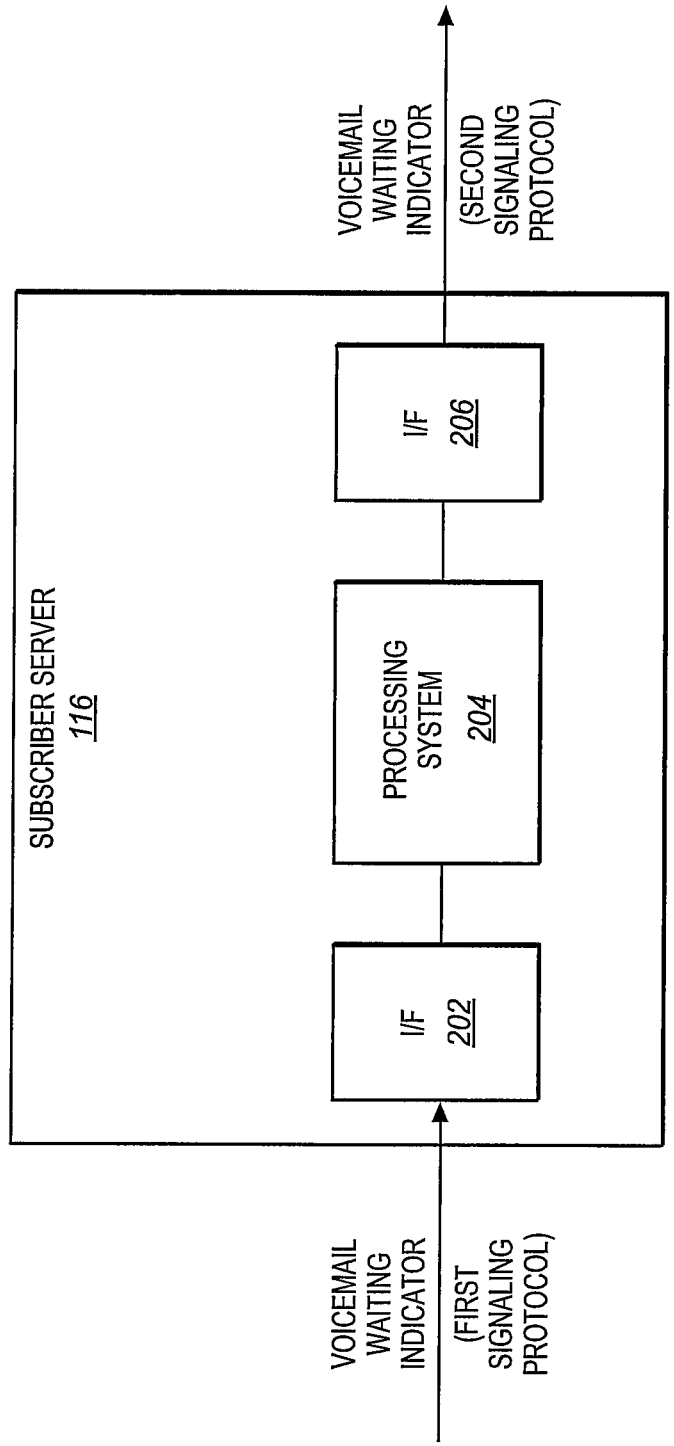
FIG. 2 illustrates a subscriber server in an exemplary embodiment of the invention.

FIG. 2 illustrates a subscriber server 116 in an exemplary embodiment of the invention. Subscriber server 116 includes a first interface 202, a processing system 204, and a second interface 206. Interface 202 is adapted to communicate with nodes of communication network 110, such as voicemail server 114 and CCF 112, according to the first signaling protocol used in communication network 110. For example, the interface 202 may comprise an ANSI interface. Interface 206 is adapted to communicate with nodes of communication network 120, such as CCF 122, according to the second signaling protocol used in communication network 120. For example, interface 206 may comprise a GSM MAP interface. Subscriber server 116 may include additional interfaces adapted to communicate with nodes of other communication networks (not shown) according to other signaling protocols. Processing system 204 is adapted to provide an interworking function to convert messages between the different signaling protocols used by the different types of communication networks. Processing system 204 may be implemented as software, hardware, or a combination of hardware and software. In a software implementation, processing system 204 may execute instructions that are stored on storage media. Some examples of instructions are software, program code, and firmware. Some examples of storage media are memory devices, tape, disks, integrated circuits, and servers. The instructions are operational when executed by processing system 204 to direct processing system 204 to operate in accordance with the invention. The term "processing system" refers to a single processing device or a group of inter-operational processing devices. Some examples of processors are computers, integrated circuits, and logic circuitry.

In this embodiment as illustrated in FIG. 1, assume that user 132 has subscribed to phone service and voicemail service in communication network 110, which may be referred to as the home network for user 132. Also assume that user 132 is roaming or has moved to an area serviced by communication network 120, which may be referred to as a visiting network for user 132. User 132 thus receives phone service from communication network 120 through communication device 130. User 132 is either not able to receive phone service from communication network 110 based on his/her location, or may have selected to receive phone service from communication network 120. In either case, user 132 is not receiving phone service simultaneously from networks 110 and 120.

To receive phone service from communication network 120, communication device 130 first registers with communication network 120. During registration, CCF 122 in communication network 120 transmits a register message to subscriber server 116 indicating that user 132 has registered with communication network 120. The register message may also indicate the signaling protocol that is used in communication network 120. Responsive to receiving the register message, subscriber server 116 updates the subscriber profile for user 132 by storing an indication that user 132 is registered with communication network 120 and by possibly storing an indication of the type of signaling protocol used in communication network 120.

While communication device 130 is receiving phone service from communication network 120, further assume that voicemail server 114 receives one or more calls intended for user 132 and records one or more voicemail messages for user 132. When the voicemail messages are stored in voicemail server 114 and available for retrieval, the voicemail messages are termed "waiting". According to this embodiment, voicemail server 114 is able to provide a notification of a waiting voicemail message to user 132 through subscriber server 116.

To initiate notification to user 132, voicemail server 114 generates a voicemail waiting indicator in the first signaling protocol used in communication network 110. A voicemail waiting indicator comprises any message, signal, flag, or data that indicates that one or more voicemail messages are being stored in a voicemail server and available for retrieval. Voicemail server 114 then determines where to route the voicemail waiting indicator. In one embodiment, voicemail server 114 transmits a query to subscriber server 116 to identify the network from which user 132 is presently receiving phone service. Subscriber server 116 determines which network 110 or 120 is providing phone service to user 132, such as by retrieving the subscriber profile for user 132, and transmits a response message to voicemail server 114. The response message indicates where to route the voicemail waiting indicator. For instance, if user 132 is receiving phone service from communication network 110, then the response message may include instructions to route the voicemail waiting indicator to CCF 112 so that CCF 112 may provide the voicemail waiting indicator to user 132 in a conventional fashion. If user 132 is receiving phone service from communication network 120, then the response message may include instructions to route the voicemail waiting indicator to subscriber server 116. In any event, when user 132 is receiving phone service from a network other than communication network 110 (i.e., the home network of user 132), the voicemail waiting indicator is routed to subscriber server 116 (either directly from voicemail server 114 or through another network node such as CCF 112). Subscriber server 116 then operates as follows responsive to receiving the voicemail waiting indicator.

Figure 3:
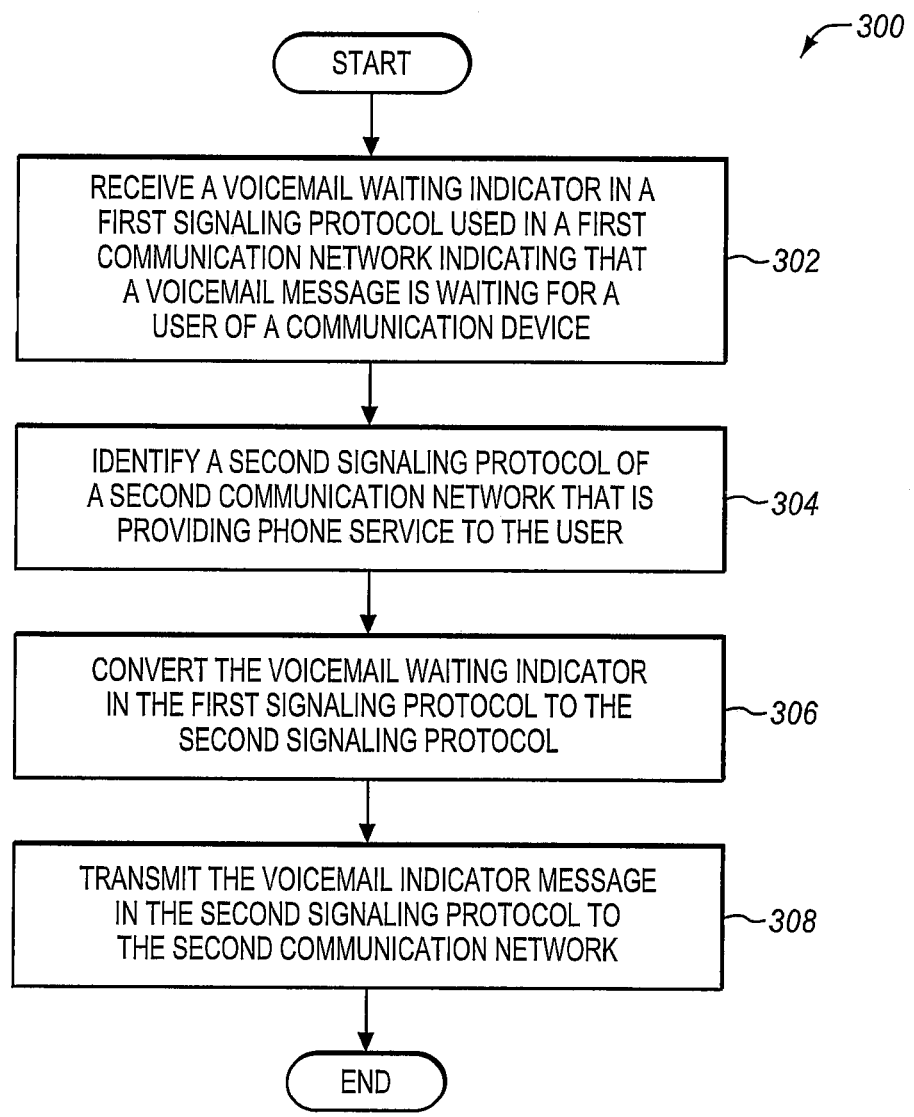
FIG. 3 is a flow chart illustrating a method of providing notification of a waiting voicemail message in an exemplary embodiment of the invention.

FIG. 3 is a flow chart illustrating a method 300 of providing notification of a waiting voicemail message in an exemplary embodiment of the invention. The steps of method 300 will be described with reference to communication system 100 in FIG. 1 and subscriber server 116 in FIG. 2. The steps of the flow chart in FIG. 3 are not all inclusive and may include other steps not shown.

In step 302 of method 300, interface 202 of subscriber server 116 receives the voicemail waiting indicator in the first signaling protocol used in communication network 110. The voicemail waiting indicator indicates that a voicemail message is being stored by voicemail server 114. In step 304, processing system 204 identifies the second signaling protocol used in communication network 120. Processing system 204 may identify the signaling protocol used in communication network 120 in a variety of ways. For instance, processing system 204 may retrieve the subscriber profile for user 132 to identify the signaling protocol used in communication network 120. Processing system 204 may alternatively query a node or server in communication network 120 to identify the signaling protocol. In step 306, processing system 204 converts the voicemail waiting indicator in the first signaling protocol used in communication network 110 to the second signaling protocol used in communication network 120. Subscriber server 116 thus acts as an interworking point between communication network 110 and communication network 120 to translate signaling messages between the networks.

In step 308, interface 206 transmits the voicemail waiting indicator in the second signaling protocol to communication network 120 to provide for notification of the waiting voicemail message. More particularly, interface 206 transmits the voicemail waiting indicator in the second signaling protocol to CCF 122 in communication network 120. CCF 122 then processes the voicemail waiting indicator received from subscriber server 116, and forwards the voicemail waiting indicator to communication device 130 of user 132 in the appropriate manner. Communication device 130 then processes the voicemail waiting indicator to display an icon or some other indication that user 132 has received a voicemail message. User 132 may then dial a directory number for voicemail server 114 through communication device 130 or another device to retrieve the voicemail message.

Interface 206 may also set a timer responsive to transmitting the voicemail waiting indicator to communication network 120. Interface 206 then monitors the timer. If interface 206 receives a response message from CCF 122 indicating that the voicemail waiting indicator was received, then interface 206 clears the timer. If the timer expires, then interface 206 re-transmits the voicemail waiting indicator to communication network 120. Interface 206 may re-transmit the voicemail waiting indicator a threshold number of times.

Communication system 100 as described in FIGS. 1-3 advantageously provides an effective way of providing notifications of waiting voicemail messages between two different types of communication networks using subscriber server 116. Subscriber server 116 receives voicemail waiting indicators from nodes in communication network 110, and acts as an interworking point between communication network 110 and communication network 120 to convert the voicemail waiting indicators from the signaling protocol used in communication network 110 to the signaling protocol used in communication network 120. Subscriber server 116 may more easily identify the signaling protocol used in communication network 120, such as through registration information for communication device 130 that is received from communication network 120. This is compared to other nodes of communication network 110, such as CCF 112 that traditionally provides voicemail waiting indicators, which may not be able to efficiently determine the signaling protocol used by communication network 120. In response to the voicemail waiting indicator provided by subscriber server 116, a communication device 130 receiving phone service from communication network 120 may thus receive notification of waiting voicemail messages being stored in a voicemail server 114 of communication network 110.

EXAMPLES

Figure 4:
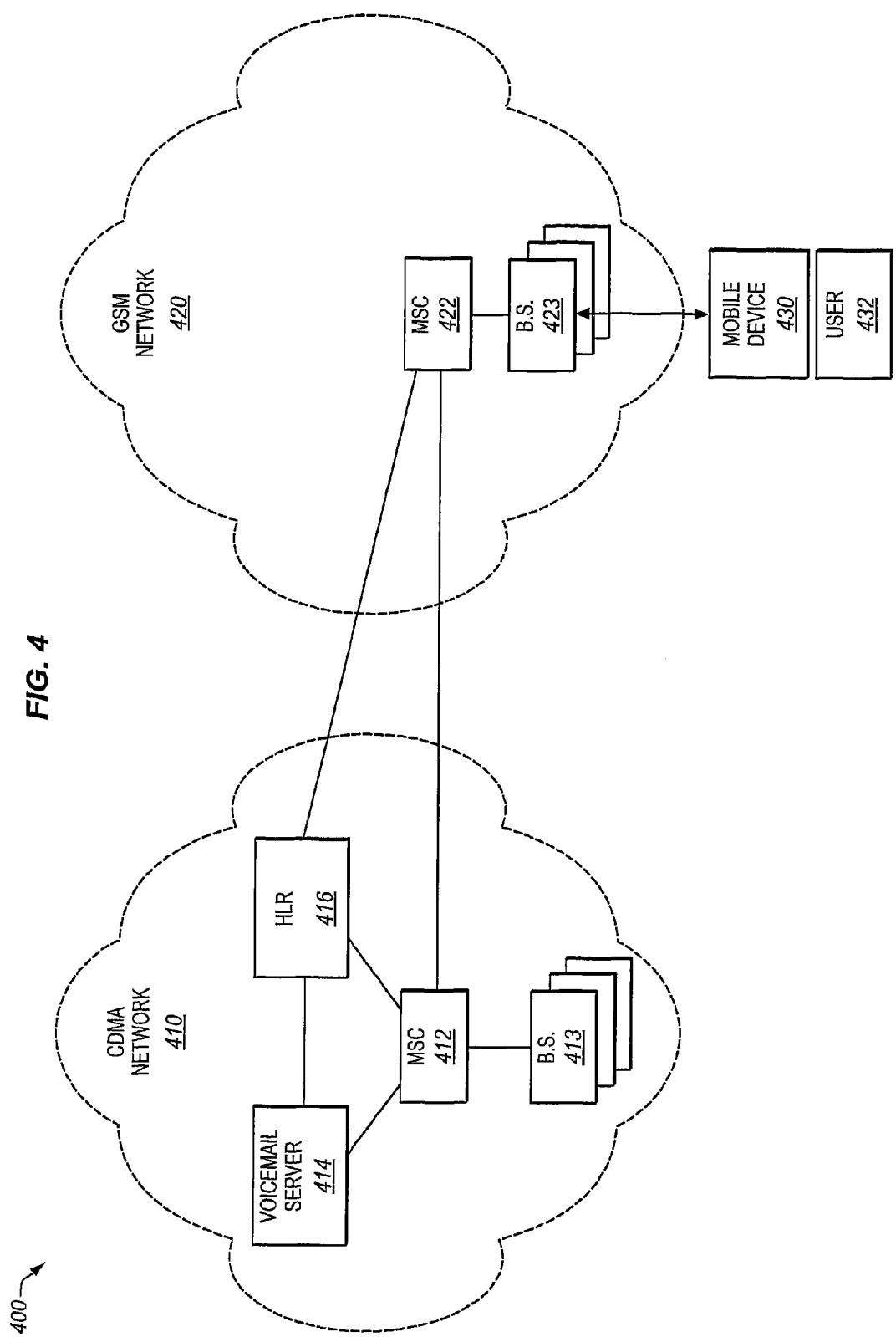
FIG. 4 illustrates a communication system comprised of different types of mobile networks in an exemplary embodiment of the invention.

FIGS. 4-7 illustrate examples of how to provide notification of an available voicemail message between different types of mobile networks. FIG. 4 illustrates a communication system 400 comprised of different types of mobile networks in an exemplary embodiment of the invention. Communication system 400 includes a CDMA network 410 and a GSM network 420. The network clouds illustrating the networks are not being used to show the actual service areas of the networks, as the service areas may be separate or overlap. CDMA network 410 includes a Mobile Switching Center (MSC) 412, a plurality of base stations (B.S.) 413, a voicemail server 414, and an HLR 416 (which represents a subscriber server as illustrated in FIG. 1). Base stations 413 are adapted to communicate with mobile devices according to CDMA standards. CDMA network 410 is adapted to use ANSI as the signaling protocol.

GSM network 420 includes an MSC 422 and a plurality of base stations (B.S.) 423. Base stations 423 are adapted to communicate with mobile devices according to GSM standards. GSM network 420 is adapted to use GSM MAP as the signaling protocol.

Networks 410 and 420 may be managed by the same service provider, such as Verizon, Sprint, Cingular, etc, or they may be managed by different service providers. These types of mobile networks are just examples to illustrate how to use HLR 416 to provide notifications of waiting voicemail messages. A similar operation may be extended to other types of mobile networks not shown.

Assume for this embodiment that a user 432 of mobile device 430 in FIG. 4 has subscribed to phone service and voicemail service in CDMA network 410 but is roaming in GSM network 420. Mobile device 430 has dual-mode capabilities allowing mobile device 430 to roam in GSM network 420 even though the subscription of user 432 is in CDMA network 410. To receive phone service from GSM network 420, mobile device 430 registers with MSC 422. MSC 422, or a corresponding HLR in GSM network 420, transmits a register message to HLR 416 indicating that mobile device 430 has registered with GSM network 420. The register message from MSC 422 includes an indication of the signaling protocol used in GSM network 420, which is MAP protocol. HLR 416 then stores registration information and the signaling protocol of GSM network 420 in a subscriber profile for user 432. Further assume that a call is placed to mobile device 430 in CDMA network 410, and the call is routed to voicemail server 414.

Figure 5:
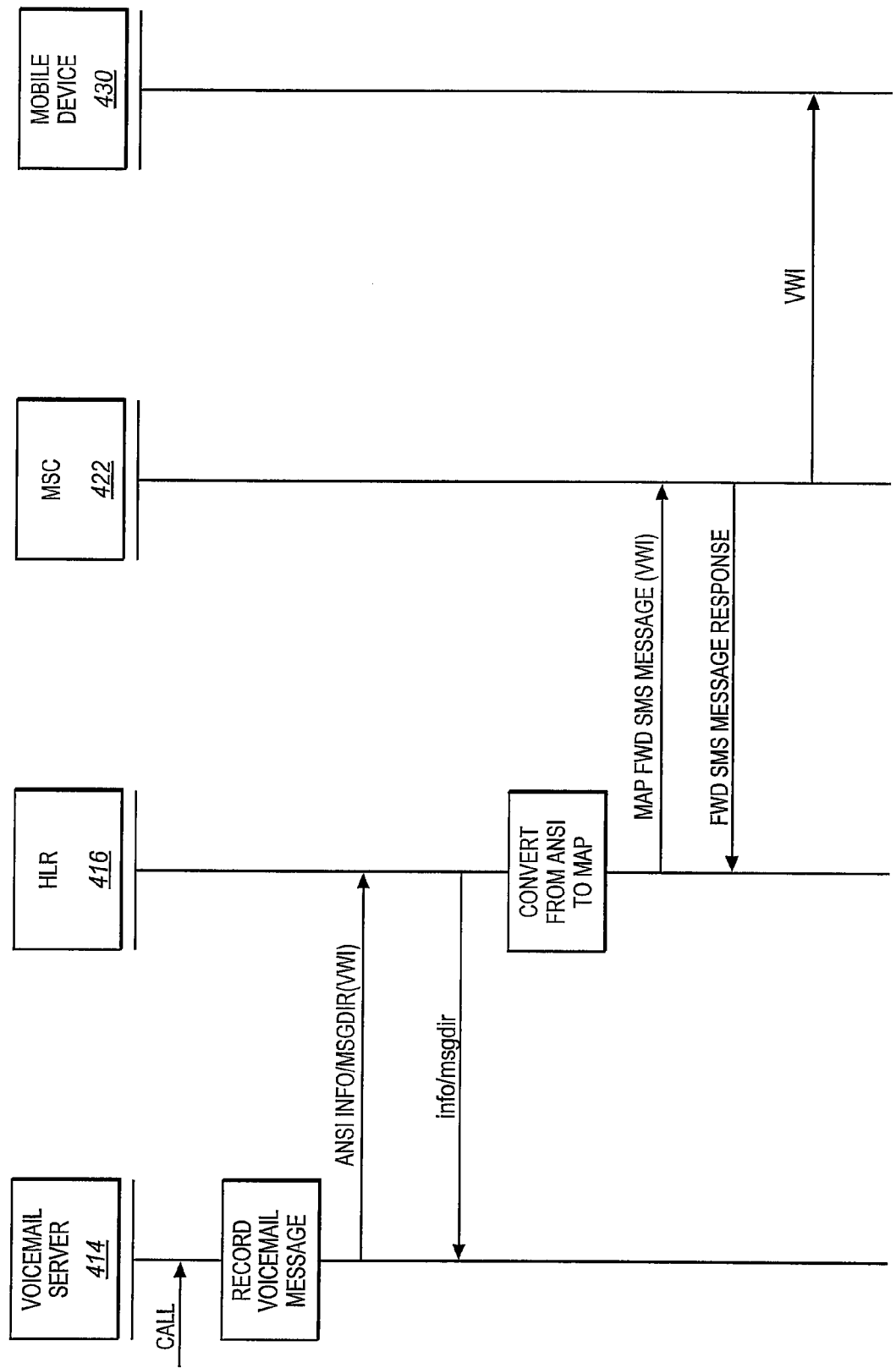
FIG. 5 is a message diagram illustrating notification of a waiting voicemail message between a CDMA network and a GSM network in an exemplary embodiment of the invention.

FIG. 5 is a message diagram illustrating notification of a waiting voicemail message between a CDMA network and a GSM network in an exemplary embodiment of the invention. Voicemail server 414 in CDMA network 410 receives the incoming call and records a voicemail message for user 432. Voicemail server 414 then generates a voicemail waiting indicator in ANSI protocol, such as by formatting an ANSI Information Directive (INFO)/Message Directive (INFO/MSGDIR) message to include the voicemail waiting indicator (VWI). Voicemail server 414 also determines where to route the INFO/MSGDIR message. To determine where to route the INFO/MSGDIR message (not illustrated in FIG. 4), voicemail server 114 transmits a query to MSC 412. MSC 412 then transmits a query to HLR 416 to identify the network from which user 432 is presently receiving phone service. HLR 416 determines which network 410 or 420 is providing phone service to user 432, such as by retrieving the subscriber profile for user 432, and transmits a response message to MSC 412. MSC 412 then transmits a response message to voicemail server 414 instructing voicemail server 414 to route the INFO/MSGDIR message to HLR 416. Responsive to the response message from MSC 412, voicemail server 414 transmits the INFO/MSGDIR message to HLR 416 (see FIG.

5). In addition to the voicemail waiting indicator, the INFO/MSGDIR message may include additional voicemail information, such as a calling directory number, a call time, a short indication of content of the voicemail message, etc.

Responsive to receiving the INFO/MSGDIR message, HLR 416 transmits an INFO/MSGDIR response message (info/msgdir) to voicemail server 414. HLR 416 also determines that user 432 is being presently served by GSM network 420 which comprises a different technical network than CDMA network 410 (i.e., uses different signaling protocol). HLR 416 identifies the signaling protocol used in GSM network 420, which is MAP. HLR 416 then converts the ANSI INFO/MSGDIR message to a MAP Forward SMS message. The Forward SMS message is formatted to include a voicemail waiting indicator which indicates that a voicemail message is waiting in voicemail server 414. HLR 416 then transmits the Forward SMS message to MSC 422 in GSM network 420. HLR 416 also sets the pending Foreign_MWI_Pending flag in common data.

In response to the Forward SMS message, MSC 422 delivers a voicemail waiting indicator to mobile device 430 of user 432, and transmits a Forward SMS Message response to HLR 416. HLR 416 clears the Foreign_MWI_Pending flag indicating the Forward SMS message was successfully delivered. Mobile device 430 converts the voicemail waiting indicator into an alerting signal, such as an icon, so that user 432 is notified of the waiting voicemail message. User 432 may then call voicemail server 414 to retrieve the waiting voicemail message.

If the Forward SMS message was not successfully delivered to MSC 422, then HLR 416 keeps the Foreign_MWI_Pending flag set. HLR 416 may then re-send the Forward SMS Message to MSC 422 after a time period or responsive to receiving a register message or a re-register message from MSC 422.

Figure 6:
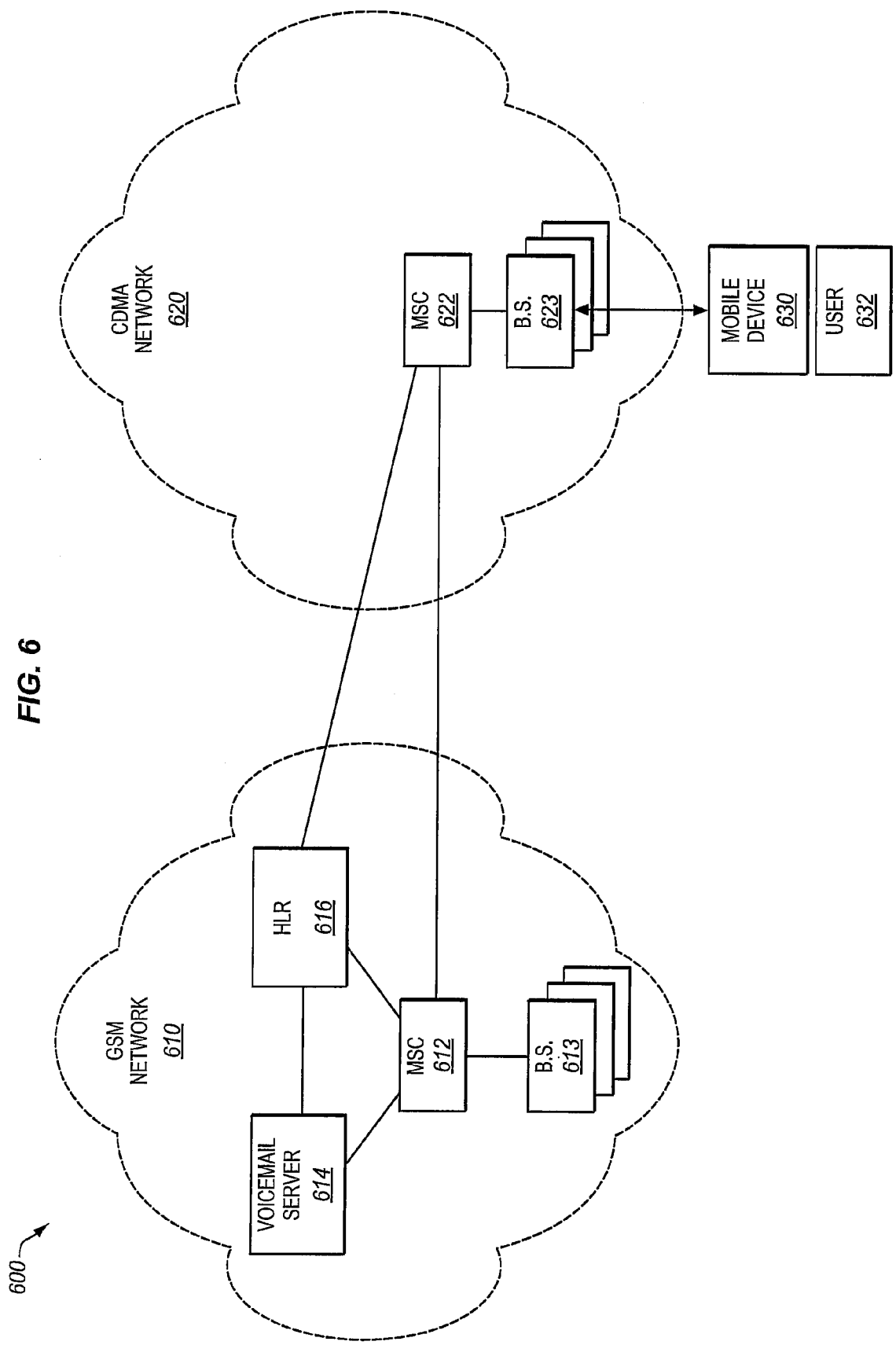
FIG. 6 illustrates a communication system comprised of different types of mobile networks in an exemplary embodiment of the invention.

FIG. 6 illustrates a communication system 600 comprised of different types of mobile networks in an exemplary embodiment of the invention. Communication system 600 includes a GSM network 610 and a CDMA network 620. The network clouds illustrating the networks are not being used to show the actual service areas of the networks, as the service areas may be separate or overlap. GSM network 610 includes a Mobile Switching Center (MSC) 612, a plurality of base stations (B.S.) 613, a voicemail server 614, and an HLR 616 (which represents a subscriber server as illustrated in FIG. 1). Base stations 613 are adapted to communicate with mobile devices according to GSM standards. GSM network 610 is adapted to use MAP as the signaling protocol.

CDMA network 620 includes an MSC 622 and a plurality of base stations (B.S.) 623. Base stations 623 are adapted to communicate with mobile devices according to CDMA standards. CDMA network 620 is adapted to use ANSI protocol.

Assume for this embodiment that a user 632 of mobile device 630 in FIG. 6 has subscribed to phone service and voicemail service in GSM network 610 but is roaming in CDMA network 620. Mobile device 630 has dual-mode capabilities allowing mobile device 630 to roam in CDMA network 620 even though the subscription of user 632 is in GSM network 610. To receive phone service from CDMA network 620, mobile device 630 registers with MSC 622. MSC 622, or a corresponding HLR in CDMA network 620, transmits a register message to HLR 616 indicating that mobile device 630 has registered with CDMA network 620. The register message from MSC 622 includes an indication of the signaling protocol used in CDMA network 620, which is ANSI protocol. HLR 616 then stores registration information and the signaling protocol of CDMA network 620 in a subscriber profile for user 632. Further assume that a call is placed to mobile device 630 in GSM network 610, and the call is routed to voicemail server 614.

Figure 7:
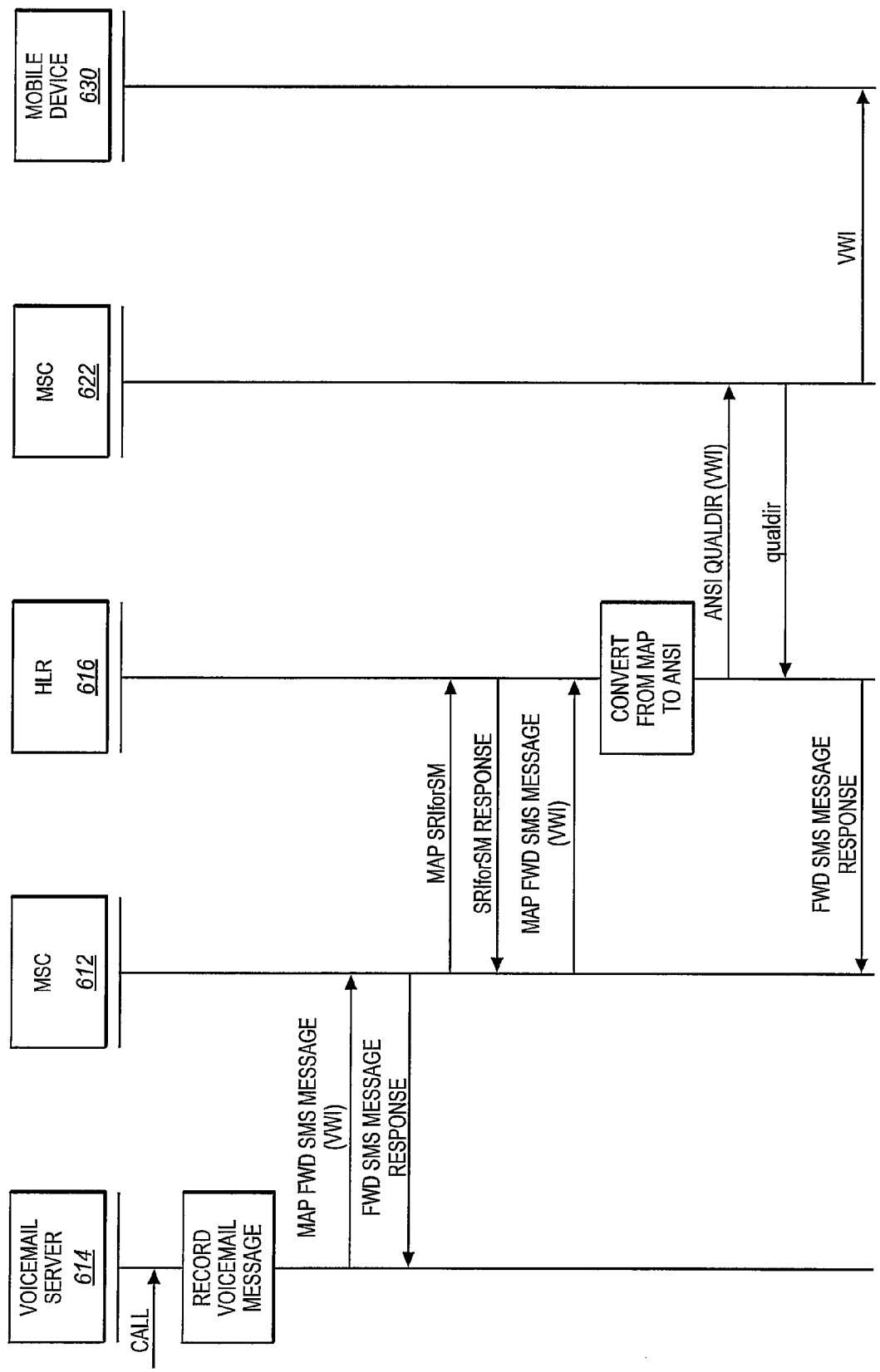
FIG. 7 is a message diagram illustrating notification of a waiting voicemail message between a GSM network and a CDMA network in an exemplary embodiment of the invention.

FIG. 7 is a message diagram illustrating notification of a waiting voicemail message between a GSM network and a CDMA network in an exemplary embodiment of the invention. Voicemail server 614 in GSM network 610 receives the incoming call and records a voicemail message for user 632. Voicemail server 614 then generates a MAP Forward SMS message that includes a voicemail waiting indicator (VWI) and possibly other voicemail information. For instance, the voicemail information may include a calling directory number, a call time, a short indication of content of the voicemail message, etc. Voicemail server 614 then transmits the Forward SMS message to MSC 612.

MSC 612 generates a Send Routing Information for Short Message (SRIforSM) and transmits the SRIforSM message to HLR 616. Responsive to the SRIforSM message, HLR 616 determines which network 610 or 620 is providing phone service to user 632, such as by retrieving the subscriber profile for user 632. Because CDMA network 620 is presently providing phone service to user 632, HLR 616 determines that the voicemail waiting indicator should be routed to itself. HLR 616 thus generates a SRIforSM response message indicating the network node number for HLR 616, and transmits the SRIforSM response message to MSC 612. MSC 612 processes the SRIforSM response message to identify the routing information (the network node number for HLR 616) for the voicemail waiting indicator. MSC 612 then forwards the MAP Forward SMS message to HLR 616.

Responsive to receiving the Forward SMS message, HLR 616 determines that user 632 is being presently served by CDMA network 620 that comprises a different technical network than GSM network 610 (i.e., uses different signaling protocol). HLR 616 identifies the signaling protocol used in CDMA network 620, which is ANSI. HLR 616 then converts the MAP Forward SMS message to an ANSI Qualification Directive (QUALDIR) message. The QUALDIR message is formatted to include a voicemail waiting indicator which indicates that a voicemail message is waiting in voicemail server 614. HLR 616 then transmits the QUALDIR message to MSC 422 in CDMA network 620. HLR 616 also sets the pending Foreign_MWI_Pending flag in common data.

MSC 622 delivers a voicemail waiting indicator to mobile device 630 of user 632, and transmits a Qualification Directive (qualdir) response message to HLR 616. HLR 616 clears the Foreign_MWI_Pending flag indicating the QUALDIR message was successfully delivered. Mobile device 630 converts the voicemail waiting indicator into an alerting signal, such as an icon, so that user 632 is notified of the waiting voicemail message. User 632 may then call voicemail server 614 to retrieve the available voicemail message.

If the QUALDIR message was not successfully delivered to HLR 616, then HLR 616 keeps the Foreign_MWI_Pending flag set. HLR 616 may then re-send the QUALDIR message to MSC 622 after a time period or responsive to receiving a register message or a re-register message from MSC 622.

Although specific embodiments were described herein, the scope of the invention is not limited to those specific embodiments. The scope of the invention is defined by the following claims and any equivalents thereof.

We claim:

1. A subscriber server adapted to notify a user of a communication device of a waiting voicemail message, where the communication device is dual mode and is able to receive service from a first communication network and a second communication network, the subscriber server comprising:

a processor;
a first interface adapted to receive a voicemail waiting indicator in a first signaling protocol indicating that a voicemail message for the user is being stored by a voicemail server in the first communication network for a call placed to the communication device, wherein the communication device is receiving phone service from the second communication network that uses a second signaling protocol that is different than the first signaling protocol used in the first communication network;
a processing system adapted to identify the second signaling protocol used in the second communication network that is providing phone service to the communication device of the user, and to convert the voicemail waiting indicator in the first signaling protocol to the second signaling protocol; and
a second interface adapted to transmit the voicemail waiting indicator in the second signaling protocol to the second communication network to provide for notification of the waiting voicemail message to the user of the communication device;
wherein the first interface, the processing system and the second interface are executed by the processor.

2. The subscriber server of claim 1 wherein:
the second interface is further adapted to receive a register message from the second communication network for registering the communication device with the second communication network, wherein the register message includes an indication of the second signaling protocol used in the second communication network; and
the processing system is further adapted to store the indication of the second signaling protocol in a subscriber profile for the user of the communication device.

3. The subscriber server of claim 2 wherein:
the processing system is further adapted to identify the second signaling protocol used in the second communication network based on the indication of the second signaling protocol stored in the subscriber profile for the user of the communication device.

4. The subscriber server of claim 1 wherein:
the second interface is further adapted to set a timer responsive to transmitting the voicemail waiting indicator to the second communication network, and to re-transmit the voicemail waiting indicator to the second communication network upon expiration of the timer.

5. The subscriber server of claim 1 wherein the processing system is further adapted to convert the voicemail waiting indicator in GSM MAP protocol to ANSI protocol, or vice-versa.

6. The subscriber server of claim 1 wherein the processing system is further adapted to convert the voicemail waiting indicator in GSM MAP protocol to Session Initiation Protocol (SIP), or vice-versa.

7. The subscriber server of claim 1 wherein the processing system is further adapted to convert the voicemail waiting indicator in ANSI protocol to Session Initiation Protocol (SIP), or vice-versa.

8. The subscriber server of claim 1 wherein the subscriber server comprises a Home Location Register (HLR), a Home Subscriber Server (HSS), or a combined Home Location Register (HLR)/Home Subscriber Server (HSS).

9. A method of operating a subscriber server to notify a user of a communication device of a waiting voicemail message, where the communication device is dual mode and is able to receive service from a first communication network and a second communication network, the method comprising:
receiving a voicemail waiting indicator in a first signaling protocol indicating that a voicemail message for the user is being stored by a voicemail server in the first communication network for a call placed to the communication device, wherein the communication device of the user is receiving phone service from the second communication network that uses a second signaling protocol that is different than the first signaling protocol used in the first communication network;
identifying the second signaling protocol used in the second communication network that is providing phone service to the communication device of the user;
converting the voicemail waiting indicator in the first signaling protocol to the second signaling protocol; and
transmitting the voicemail waiting indicator in the second signaling protocol to the second communication network to provide for notification of the waiting voicemail message to the user of the communication device.

10. The method of claim 9 further comprising:
receiving a register message from the second communication network for registering the communication device with the second communication network, wherein the register message includes an indication of the second signaling protocol used in the second communication network; and
storing the indication of the second signaling protocol in a subscriber profile for the user of the communication device.

11. The method of claim 10 wherein identifying the second signaling protocol used in the second communication network comprises:
identifying the second signaling protocol used in the second communication network based on the indication of the second signaling protocol stored in the subscriber profile for the user of the communication device.

12. The method of claim 9 further comprising:
setting a timer responsive to transmitting the voicemail waiting indicator to the second communication network; and
re-transmitting the voicemail waiting indicator to the second communication network upon expiration of the timer.

13. The method of claim 9 wherein converting the voicemail waiting indicator in the first signaling protocol to the second signaling protocol comprises:
converting the voicemail waiting indicator in GSM MAP protocol to ANSI protocol, or vice-versa.

14. The method of claim 9 wherein converting the voicemail waiting indicator in the first signaling protocol to the second signaling protocol comprises:
converting the voicemail waiting indicator in GSM MAP protocol to Session Initiation Protocol (SIP), or vice-versa.

15. The method of claim 9 wherein converting the voicemail waiting indicator in the first signaling protocol to the second signaling protocol comprises:
converting the voicemail waiting indicator in ANSI protocol to Session Initiation Protocol (SIP), or vice-versa.

16. The method of claim 9 wherein the subscriber server comprises a Home Location Register (HLR), a Home Subscriber Server (HSS), or a combined Home Location Register (HLR)/Home Subscriber Server (HSS).

17. A communication network adapted to notify a user of a communication device of a waiting voicemail message, wherein the communication network uses a first signaling protocol, and wherein the communication device is receiving phone service from a second communication network that uses a second signaling protocol that is different than the first signaling protocol, the communication network comprising:
- a subscriber server adapted to store a subscriber profile for the user of the communication device, where the communication device is dual mode and is able to receive service from the communication network and the second communication network; and
- a voicemail server adapted to receive a voicemail message for the user of the communication device for a call placed to the communication device, and to initiate transmission of a voicemail waiting indicator in the first signaling protocol to the subscriber server indicating that the voicemail message is waiting;
- the subscriber server is further adapted to receive the voicemail waiting indicator in the first signaling protocol, to identify the second signaling protocol used in the second communication network, to convert the voicemail waiting indicator in the first signaling protocol to the second signaling protocol, and to transmit the voicemail waiting indicator in the second signaling protocol to the second communication network to provide for notification of the waiting voicemail message to the user of the communication device.

18. The communication network of claim 17 wherein the subscriber server is further adapted to:
- receive a register message from the second communication network for registering the communication device with the second communication network, wherein the register message includes an indication of the second signaling protocol used in the second communication network; and
- store the indication of the second signaling protocol in the subscriber profile for the user of the communication device.

19. The communication network of claim 18 wherein the subscriber server is further adapted to:
- identify the second signaling protocol used in the second communication network based on the indication of the second signaling protocol stored in the subscriber profile for the user of the communication device.

20. The communication network of claim 17 wherein the subscriber server is further adapted to:
- set a timer responsive to transmitting the voicemail waiting indicator to the second communication network; and
- re-transmit the voicemail waiting indicator to the second communication network upon expiration of the timer.

* * * * *